Nov. 9, 19 3,618,367

VIBRATION PICK-UP DEVICE

Filed Jan. 22, 1970

INVENTOR.
MARCELLUS S. MERRILL
BY
Sheridan, Ross and Burton
ATTORNEYS

United States Patent Office 3,618,367
Patented Nov. 9, 1971

3,618,367
VIBRATION PICK-UP DEVICE
Marcellus S. Merrill, 335 Colorado Blvd.,
Denver, Colo. 80206
Filed Jan. 22, 1970, Ser. No. 4,804
Int. Cl. G01n 24/00
U.S. Cl. 73—71.4                                      10 Claims

ABSTRACT OF THE DISCLOSURE

Apparatus for balancing rotatable bodies, such as automotive vehicle wheels, characterized by an electromagnetic pick-up device including a pair of cantilevered springs providing a double spring suspension, one being supported by the other, and including suitable damping means, the construction being such that the signal output has non-linear characteristics with change in frequency.

BACKGROUND OF THE INVENTION

In the art of balancing automotive vehicle wheels it has been common practice to spin a wheel to desired speed, detect the amplitude of unbalance, and then add a suitable weight or weights to the wheel to compensate for the unbalance. A well known procedure is to electrically couple a vibration pick-up of the electromagnetic type with a stroboscopic light which triggers its illumination of a reference point on the wheel, such as a valve stem at an observed position each revolution, the amplitude of vibration being simultaneously registered on a meter which is a measure of the amount of compensating weight to be added to the wheel. The actual point at which the weight is to be added, however, is angularly related to the reference point, generally referred to as the phase angle, and as will be apparent, this angle must be determined in order that the weight may be added at the proper point or points. It is also known that the phase angle increases with speed of rotation of the wheel, being substantially in phase at very low speeds and increasing to substantially 180° at high speeds. It is further known that the amplitude of unbalance increases with speed of rotation, reaches an upwardly convex peak at a speed where resonance occurs, and then decreases to some intermediate but generally constant value. If a speed is chosen above resonance where the phase angle is about 180° it thus becomes apparent that the unbalance correction must be applied to the wheel at approximately 180° (6 o'clock) from a top point (12 o'clock), which top point is determined with the wheel stationary and the reference point disposed at the position it was observed while rotating, the meter reading being a measure of the amount of weight to be added, this being well known in the art. Certain errors arise, however, in this technique. For example, since the wheel is resiliently affixed to the vehicle, parts other than the wheel produce vibrations such as harmonics or hash, which are detected by the pick-up and produce inaccurate or unreliable meter readings. Also, since pick-ups of the type referred to have so far as known, been of the linear type, with simple vibrating reed supports, the generated voltage has been directly proportional to wheel speed, introducing further unreliable meter readings. Additionally, the harmonics have affected the circuitry between the pick-up and stroboscopic light in such manner that the phase angle could not be assumed to be a constant value.

In another technique it has been the practice to spin a wheel above resonant speed and allow it to coast through resonant speed where a maximum unbalance signal is generated. It is generally considered that the phase angle at resonance is approximately 90°; however, this is true only if the pickup system is damped in some way. In the absence of such damping, it is difficult to determine the phase angle with any reasonable degree of accuracy unless complex unlinear pick-up systems are employed.

The two relatively high speed techniques just described have been employed for quite some time with generally successful results, particularly when practiced by a highly skilled operator. A recent change in underwriter safety requirements has, however, made it desirable to perform the balancing operation at lower spin speeds, if feasible. Under these requirements high speed sparking motors may not be employed within certain distances of floor level where they could initiate a fire or explosion. The spinner motor must thus be of the totally enclosed explosion proof type or the three-phase type which is sparkless. The latter for economic and spatial reasons is preferable; however, it cannot be operated at as high a speed as certain sparking motors of the commutator type. For example, a two pole motor, which is the minimum possible, operates at slightly less than 3600 r.p.m. on 60 cycle electric supply. The spatial requirements available for the motor and its tire engaging driving roll are sometimes limited and hence it becomes difficult to obtain high wheel spin speed with spinning apparatus which will conveniently fit within the available space. Such an apparatus and the problems involved are further disclosed in co-pending application of M. S. Merrill, for "Apparatus for Detecting Unbalance of Vehicle Wheels," Ser. No. 811,727, filed April 1, 1969, which also discloses exemplary apparatus with which the present invention may be employed. It thus becomes apparent that in those instances where it would be unfeasible or impractical to provide spinning apparatus which could spin a wheel at the heretofore high speeds, it becomes mandatory that unbalance detection means be devised which would accurately detect wheel unbalance at lower speeds.

SUMMARY OF THE INVENTION

In recognition of the need for unbalance detection at lower speeds than those heretofore employed and the desire for improvement upon the latter, the present invention provides a novel pick-up which fulfills the recognized problems in that the unbalance is more accurately detected at a predetermined speed below resonance and effects triggering of the stroboscopic light to effect a substantially constant 90° phase angle irrespective of variations of unbalance and within reasonable variations of lower wheels speeds. Thus, with the phase shift known to be constant at about 90°, the only variable which an operator need know is the amplitude of unbalance as indicated by a meter. With this variable known, he then knows how must weight to add at a predetermined angle from a point on the wheel, as previously described.

It is accordingly a principal object of this invention to provide an eletromagnetic pick-up device which has non-linear characteristics and will enable practice of the concepts described, particularly the accurate determination of phase angle and amount of corrective weight while a wheel is spinning at a speed lower than heretofore practiced.

DESCRIPTION OF THE PREFERRED EMBODIMENT

Figure 1A:
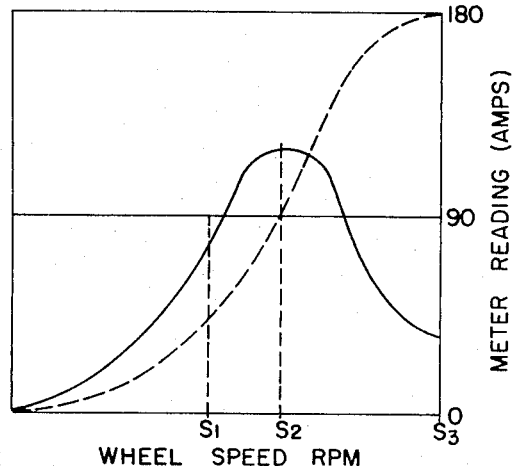
FIG. 1A graphically illustrates response characteristics of a prior art pick-up.

Before proceeding with the detailed description of the invention, reference is first made to FIG. 1A (prior art) which illustrates characteristics of a linear type electromagnetic pick-up. The full line curve illustrates the change in unbalance meter reading with change of wheel speed, whereas the dotted line illustrates the change of phase angle with change of wheel speed. It is to be noted that at a very high speed, S3, the phase angle approaches 180° and the unbalance approaches a constant minimum value, this illustrating the first technique previously referred to. It is also to be noted that at resonant speed at the peak of the meter curve, say of the order of 1200 r.p.m., the phase angle is about 90°, this illustrating the second technique previously referred to. It is to be still further noted that if it were desired to spin at a speed below S2, say a speed S1 at about 900 r.p.m., the phase angle is changing and also the unbalance curve is steeply sloped, rendering it difficult to correlate these variables.

Figure 1B:
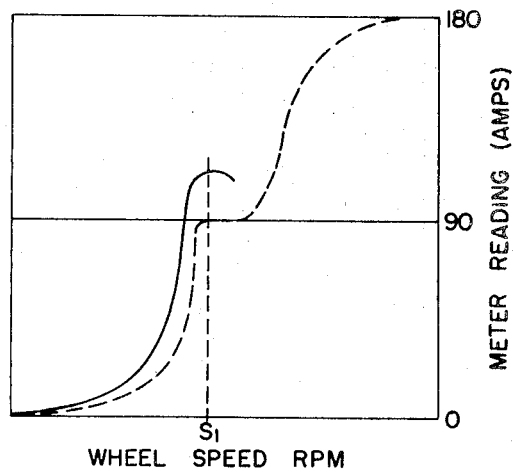
FIG. 1B similarly illustrates comparative characteristics of the present invention.

FIG. 1B, by comparison, illustrates the manner in which the present invention renders it possible to detect and correct unbalance at a speed S1, with a reasonable degree of accuracy. Here, the meter reading increases with speed but in a considerably more unlinear manner reaching a peak reading at speed S1. Due to this non-linear response the dotted phase angle curve now has a relatively constant value, or flat spot, at 90° at the ordinate of peak unbalance reading. Thus, when the peak reading is observed on the meter the operator will know that a corrective weight or weights of a now determined unbalance must be applied 90° to a certain reference point as determined by the stroboscopic light.

Figure 2:
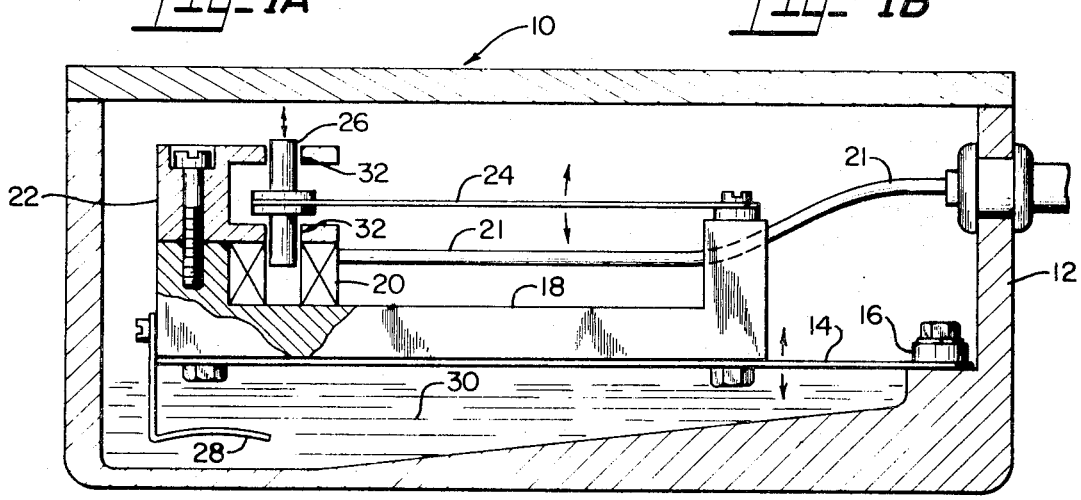
FIG. 2 is a longitudinal central section through same.

With the principal differences between a typical prior art linear response pick-up and the non-linear response of the present invention set forth, reference is now made to FIG. 2 which illustrates the principal component for attaining this end, it being understood that suitable circutry and electronic components will be employed with same, as in the prior art, to translate its signals to a suitable unbalance meter and to trigger a stroboscopic light. Pick-up 10 comprises a closed casing 12, which is rigidly secured in a horizontal position to a vibrating member which responds to wheel vibration, such for example, as the vibrating beam disclosed in the copending application previously referred to. One end of a flat main support spring or reed 14 is rigidly secured to the casing by a clamp 16 which thus forms a cantilevered support for the spring, permitting it to vibrate relative to the casing in only a vertical plane since the edgewise width of the spring provides rigidity against vibration in the plane of the spring. An aluminum base member 18 is rigidly secured to spring 14, the outer free end of the base member carrying a hollow electromagnetic coil 20 secured to same by a suitable aluminum clamp 22. A second flat pick-up spring or reed 24 is rigidly secured at one end to the base member, its outer free end carrying a permanent magnet 26, at least a portion of which is disposed within the coil core and movable in same, also only in a vertical plane. In the operation of the casing, main support spring and pick-up spring these components all vibrate relatively. The casing being rigidly affixed to a vibrating member which supports the wheel, vibrates synchronously with same. This in turn produces vibration of the main support spring and its attached base member and coil, which, in turn, excites vibration of the pick-up spring. The instantaneous voltage induced in coil 20 is thus somewhat complex since the natural frequencies of the two springs or reeds and their attached masses differ. Thus, spring 14 may be vibrating at one frequency and spring 24 may be vibrating at a different frequency, the voltage or output signal of the coil being a resultant of the instantaneous directions and speeds at which magnetic flux is cut within the coil core.

The non-linearity is obtained by damping one or both of the vibrating springs. The main support spring may be damped by an attached paddle 28 which is submerged in a viscous liquid 30, a silicone fluid of about 200 centistokes being exemplary.

Figure 4:
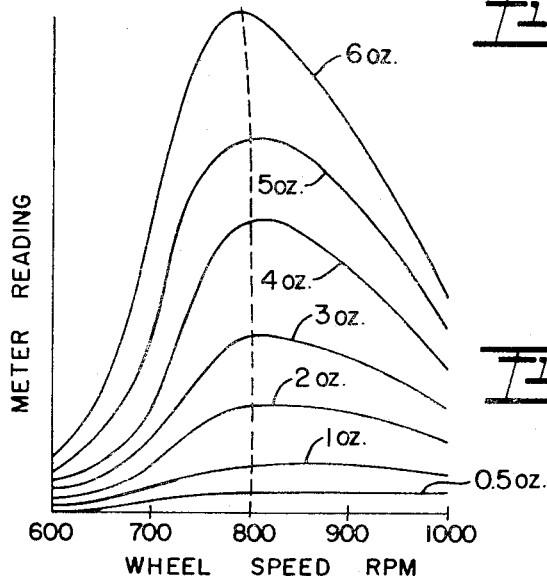
FIG. 4 graphically illustrates a family of actual response characteristics.
Figure 3:
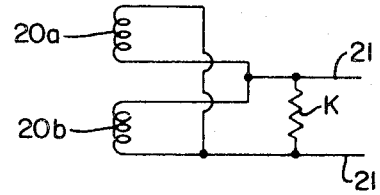
FIG. 3 illustrates a form of damping.

Damping of spring 24 may be attained in various ways. As illustrated, magnet 26 oscillates in apertures 32 of clamp 22 producing windage drag and also electromagnetic damping since the metal surrounding the magnet forms a closed circuit coil in which current is induced which tends to oppose movement of the magnet. FIG. 3 illustrates another manner of damping in which coil 20 is formed as parallel connected coils 20a, 20b, a resistor K being applied across the outputs 21. FIG. 4 illustrates a family of curves obtained with such damping. Without this damping the curves (not shown) are similar, each having a somewhat higher peak amplitude. Damping of spring 24 is thus not essential and may optionally be employed. Damping of main spring 14, however, is desired since the main spring excites the vibration of the pick-up spring and it follows that if the main spring is damped the pick-up spring is also damped whether or not it is independently damped.

The natural frequencies of the two springs and their respective attached masses are preferably such that the main spring system has a natural frequency between the first and second harmonics of the pick-up spring, preferably near the second harmonic. At the lower limits of their frequencies the main spring has a frequency of the order of 500 c.p.m. and the pick-up spring a frequency of about 250 c.p.m., this choice permitting use of simplified and economical circuitry associated with the pick-up. With more complex and less economical circuitry the upper limit of the main spring could be increased to approach 800 c.p.m. with a corresponding increase of the pick-up to about 350 c.p.m.

Referring again to FIG. 4, this illustrates a family of response characteristics as registered on a meter with variable unbalance plotted against speed. It is to be noted that the peaks or maximum amplitudes of the curves lie on a dotted line which departs only slightly from the 800 r.p.m. ordinate and at which the phase angle remains constant at approximately 90°.

It is to be understood that paddle 28 does not provide the same damping of spring 14 at all frequencies of vibration. Thus, at extremely low speeds the paddle moves relative to damping liquid 30 at low velocity and provides minimum damping restraint upon the spring. As velocity increases, however, turbulence and fluid friction increases and provides increasing restraint against relative movement between the paddle and liquid. This, as will be apparent, produces a non-linear damping force on spring 14 with increase in frequency of its oscillation relative to the casing. Other types of dampers referred to such as electromagnetic, coulomb and air damping similarly provide damping restraint which increases non-linearly with increase in frequency. For example, liquid 30 may be omitted and paddle 28 may take the form of a plurality of parallel spaced disks or plates which move within the space between poles of a permanent U-shaped magnet affixed to casing 10 and thus vibrate in a direction transverse to the flux in the air gap between the poles.

It will now be apparent that while some type of damping is required, particularly for spring 14, it may take various forms and hence the specific type of damping is not germaine to the broader aspects of the invention.

What is claimed is:

1. An electric signal generator for generating a signal corresponding to the magnitude of unbalance of a body rotating at a substantially predetermined speed, comprising:

(a) a first elongated spring supported at one end only for arcuate vibration in a direction parallel to a reference plane, (b) a second elongated spring disposed generally parallel to the first spring and supported by the latter between ends of same for like arcuate vibration,
(c) a signal pick-up coil carried by the free end of one of the springs,
(d) a magnet carried by the free end of the other spring, moveable relative to the coil for generating an alternating electric signal therein,
(e) the first spring and its attached mass having a natural frequency of vibration greater than that of the second spring and its attached mass, and
(f) and means for damping vibration of at least the first spring.

2. A generator in accordance with claim 1 including means for damping vibration of the second spring.

3. A generator in accordance with claim 1 wherein the damping means comprises a member affixed to the first spring and oscillatable in a liquid.

4. A generator in accordance with claim 3 including a housing enclosing the springs, magnet and coil, the liquid being disposed in a lower portion of same, the springs being disposed in substantially horizontal positions to thereby respond to only vertical components of vibration.

5. A generator in accordance with claim 1 wherein the natural frequency of the first spring is between about 500 and 800 c.p.m. and the natural frequency of the second spring and its attached mass is between about 200 and 300 c.p.m.

6. A generator in accordance with claim 1 including a rigid base member affixed to the first spring, means for rigidly securing the coil to the base member, and means for rigidly securing one end of the second spring to the base member.

7. A generator in accordance with claim 1 wherein said coil is affixed to the first spring and said magnet is affixed to the second spring.

8. A generator in accordance with claim 1 wherein said magnet is of the permanent type.

9. A generator in accordance with claim 1 wherein said coil comprises two windings connected in parallel to two outputs, and a resistor disposed across the ouputs, said resistor adapted to produce damping between the coil and magnet.

10. A generator in accordance with claim 1 wherein the damping means comprises a member oscillatable relative to the flux path of a magnet.

References Cited

UNITED STATES PATENTS

| | | | |
|---|---|---|---|
| 2,272,984 | 2/1942 | Ritzmann | 73—71.2 X |
| 2,552,722 | 5/1951 | King | 73—516 |

RICHARD C. QUEISSER, Primary Examiner

A. E. KORKOSZ, Assistant Examiner

U.S. Cl. X.R.

73—71.2, 516